(12) United States Patent
Hedman et al.

(10) Patent No.: US 9,402,171 B2
(45) Date of Patent: Jul. 26, 2016

(54) METHODS AND APPARATUS FOR SHORT MESSAGE SERVICE OVER A PACKET-SWITCHED DOMAIN

(71) Applicant: Telefonaktiebolaget L M Ericsson (publ), Stockholm (SE)

(72) Inventors: Peter Hedman, Helsingborg (SE); Magnus Karlsson, Lund (SE); Magnus Olsson, Stockholm (SE); Hans Bertil Rönneke, Kungsbacka (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 408 days.

(21) Appl. No.: 13/706,979

(22) Filed: Dec. 6, 2012

(65) Prior Publication Data

US 2013/0150031 A1    Jun. 13, 2013

Related U.S. Application Data

(60) Provisional application No. 61/568,892, filed on Dec. 9, 2011.

(51) Int. Cl.
| | | |
|---|---|---|
| *H04W 4/00* | (2009.01) | |
| *H04W 4/14* | (2009.01) | |
| *H04W 8/06* | (2009.01) | |
| *H04W 48/18* | (2009.01) | |
| *H04W 60/00* | (2009.01) | |

(52) U.S. Cl.
CPC ........ *H04W 4/14* (2013.01); *H04W 8/06* (2013.01); *H04W 4/005* (2013.01); *H04W 48/18* (2013.01); *H04W 60/00* (2013.01)

(58) Field of Classification Search
CPC ......... H04W 4/14; H04W 48/18; H04W 8/06; H04W 4/005
USPC ............................................... 455/433, 435.2
See application file for complete search history.

(56) References Cited

U.S. PATENT DOCUMENTS

| | | | |
|---|---|---|---|
| 2011/0194505 A1* | 8/2011 | Faccin ................ | H04W 48/18 370/329 |
| 2013/0143610 A1* | 6/2013 | Jeong .................... | H04W 4/14 455/466 |

OTHER PUBLICATIONS

EPO, Int'l Search Report in PCT/EP2012/074843, Jun. 5, 2013.
3GPP, Circuit Switched (CS) Fallback in Evolved Packet System (EPS) Stage 2 (Release 10), Technical Specification 23.272 V10.5.0, Aug. 24, 2011, pp. 1-79.

(Continued)

*Primary Examiner* — Charles Shedrick
(74) *Attorney, Agent, or Firm* — Patent Portfolio Builders PLLC (57) ABSTRACT

A wireless communication device can provide an indication that its registration in a circuit-switched domain of a network is intended only for a short message service that is included in or accompanies a registration request, such as a combined registration for both the CS domain and a packet-switched (PS) domain. The device can also change a conventional order of its domain registrations, e.g., by performing a PS-domain registration before a CS-domain registration, when it will send SMS messages over the PS domain. The device can indicate its intention to use or support for SMS over the PS domain and/or be informed about network support for SMS over the PS domain before the UE attempts a network registration.

16 Claims, 3 Drawing Sheets

(56) References Cited

OTHER PUBLICATIONS

Vodaphone, Inhibiting 2G/3G CS Access while Permitting SMS over SGs, Tdoc S2-114350, Oct. 10, 2011, 3GPP TSG-SA WG2 Meeting #87, Jeju, Korea.

CATT, Default MSC Concept for SMS delivery with PS Only Subscription, Tdoc S1-115082, Nov. 14, 2011, 3GPP SA WG2 Meeting #88, San Francisco, California.

3GPP, Systems Improvements for Machine-Type Communications (Release 11), Technical Report 23.888 V1.6.0, Dec. 2, 2011, pp. 1-161.

Lin et al., Mobility Management (GPRS to UMTS), Wireless Communications and Mobile Computing, Oct./Dec. 2001, pp. 339-359, vol. 1, issue 4.

3GPP, System Improvements for Machine-Type Communications (Release 10), Technical Report 23.888 V0.5.1, Jul. 2010.

3GPP, Discussions and Conclusions about PS-only, TDoc S2-115461, Nov. 14-18, 2011, TSG SA WG2 Meeting #88, San Francisco, CA, US.

3GPP, Service Requirements for Machine-Type Communications (MTC) Stage 1 (Release 11), Technical Specification 22.368 V11.3.0, Sep. 2009.

3GPP, PS domain only Inhibiting CS domain except for SMS over SGs, TDoc S2-114349, Oct. 10-14, 2011, SA WG2 Meeting #87, Jeju Island, KR.

3GPP, Mobile Radio Interface Layer 3 Specification, Core Network Protocols, Stage 3 (Release 11), Technical Specification 24.008 V11.0.0, Sep. 2011.

3GPP, Radio Resource Control (RRC) Protocol Specification (Release 8), Technical Specification 25.331 V8.16.0, Sep. 2011, Ch. 8.1.1.

3GPP, Radio Resource Control (RRC) Protocol (Release 8), Technical Specification 44.018 V8.13.0, Sep. 2011, Ch. 3.2.2.1.

3GPP, Radio Resource Control (RRC) Protocol Specification (Release 8), Technical Specification 36.331 V8.15.0, Sep. 2011.

3GPP, Study on Network Provided Location Information to the IMS (Release 11), Technical Report 23.842 V1.1.0, Oct. 2011.

3GPP, Change Request C1-122420, May 21-25, 2012, CT WG1 Meeting #78, Kyoto, JP.

3GPP, Change Request C1-122103, May 21-25, 2012, CT WG1, Meeting #78, Kyoto, JP.

3GPP, Change Request C1-122483, May 21-25, 2012, CT WG1, Meeting #78, Kyoto, JP.

* cited by examiner

METHODS AND APPARATUS FOR SHORT MESSAGE SERVICE OVER A PACKET-SWITCHED DOMAIN

This application claims the benefit of the filing date of U.S. Provisional Patent Application No. 61/568,892 filed on Dec. 9, 2011, which is incorporated here by reference.

TECHNICAL FIELD

This invention relates to telecommunication systems, and more particularly to communication networks having packet-switched and circuit-switched domains that can carry short message service messages.

BACKGROUND

The Third Generation Partnership Project (3GPP) is working with requirements for providing services on only the Packet-Switched (PS) domain as part of the work on Machine Type Communication (MTC), see, e.g., 3GPP Technical Report (TR) 23.888 V0.5.1, System Improvements for Machine-Type Communications (Release 10) (July 2010). Such services can be called PS-only services or PS-only features.

In the course of that work, draft architectures have been described in 3GPP Temporary Document (Tdoc) S2-115461, Discussions and Conclusions about PS-Only, that was presented at the TSG SA WG2 Meeting #88, San Francisco, Calif., Nov. 14-18, 2011. Those architectures include the following six requirements for PS-only features.

1. PS services and Short Message Service (SMS) for a User Equipment (UE) can be provided through a GSM/EDGE Radio Access Network (GERAN) and a Universal Terrestrial Radio Access Network (UTRAN) without involving a Mobile Switching Center (MSC). This includes the case where a Home Subscriber Server (HSS) does not provide subscription data to a GERAN or UTRAN MSC for that UE when both the UE and its serving Public Land Mobile Network (PLMN) support PS services or SMS.

2. Not receiving services from a GERAN or UTRAN MSC due to a UE's operation with a PS-only feature shall not affect services provided to that UE, which may include that an unsuccessful or rejected registration attempt by a PS-only UE toward a GERAN or UTRAN MSC shall not result in losing SMS provided through another Radio Access Technology (RAT) or domain used by the UE.

3. PS services and SMS can be provided through a Mobile Mobility Entity (MME) of an evolved Universal Terrestrial Radio Access Network (UTRAN) with efficient HSS signaling, which can include an HSS registration procedure that provides subscription data for PS services and SMS together and that should not have adverse effects, such as increased HSS signaling, e.g., when a UE reselects between RATs.

4. The PS-only feature shall not prevent receiving SMS when the UE or its visited or serving PLMN does not provide the capabilities required for the PS-only feature.

5. A UE can be allowed to select one or more appropriate SMS delivery mechanisms. Such mechanisms could use existing E-UTRAN access procedures for SMS via Non-Access Stratum (NAS) signaling (i.e., combined Evolved Packet System/International Mobile Subscriber Identity (EPS/IMSI) Attach and Combined Tracking Area/Location Area (TA/LA) Update) or different procedures (e.g., EPS Attach and TA Update with new information elements). The Serving CPRS Support Node (SGSN) and/or MSC registration procedures in a second-generation (2G) network, such as GERAN, or a third-generation (3G) network, such as UTRAN, could be enhanced to inform the UE that it should use only the PS domain for receiving PS and specifically SMS.

6. The PS-only features shall not affect PS services or SMS and shall work whether the UE has an assigned Mobile Subscriber Integrated Services Digital Network-Number (MSISDN) or not.

3GPP TS 22.368 V11.3.0, Service requirements for Machine-Type Communications (MTC), Stage 1 (Release 11) (September 2011) specifies requirements for PS-only operation, and 3GPP Tdoc S2-114349, PS Domain Only: Inhibiting CS Domain except for SMS over SGs, proposed a solution to fulfill the six architecture requirements of Tdoc S2-115461. 3GPP Tdoc S2-114349 was presented at the 3GPP TSG SA WG2 Meeting #87, Jeju Island, Korea, Oct. 10-14, 2011. In particular, new reject cause values are provided in Attach Accept messages that indicate to a UE receiving such a message that it shall not use the 2G and 3G Circuit Switched (CS) domains and that it is permitted to attempt combined updates in a Long Term Evolution (LTE), or E-UTRAN, network. In addition, an InsertSubscriberData response from a Home Location Register (HLR) to a MSC includes an accessRestrictionData information element that restricts the UE to LTE-only CS-domain SMS (which is to say, the UE is not allowed SMS over a 2G or 30-network CS domain).

The techniques described in Tdoc S2-115461 and Tdoc S2-114349 can still cause a UE to attempt registration over the CS domain, which can lead to rejection of the registration attempt and therefore to increased network signaling. In addition, the techniques described above do not work unless a UE's subscription is changed to a PS-only subscription, i.e., a network operator cannot simply switch on SMS over the PS domain in its 2G/3G network and offload its CS domain for any existing subscriptions.

SUMMARY

Such drawbacks and problems with previous techniques can be solved by methods and apparatus in accordance with this invention.

In accordance with aspects of this invention, there is provided a method of registering a user equipment (UE) in a communication network having a circuit-switched (CS) domain and a packet-switched (PS) domain and having a network node configured to enable the UE to send and receive short message service (SMS) messages through at least one of the CS and PS domains. The method includes receiving, at the network node, a registration request sent by the UE; and receiving, at the network node, an SMS indication by the UE, where the SMS indication shows either that the registration request is only for SMS over the CS domain or that the registration request is a PS domain registration received before a CS domain registration and is for SMS over the PS domain.

Also in accordance with aspects of this invention, there is provided a network node configured for registering a UE in a communication network having a CS domain and a PS domain that includes the network node configured to enable the UE to send and receive SMS messages through at least one of the CS and PS domains. The network node includes an electronic processor circuit configured for receiving a registration request sent by the UE and an SMS indication by the UE, where the SMS indication shows either that the registration request is only for SMS over the CS domain or that the registration request is a PS domain registration received before a CS domain registration and is for SMS over the PS domain.

Also in accordance with aspects of this invention, there is provided a method in a UE for registering the UE with a network node of a communication network for SMS messages over at least one of a CS domain and a PS domain. The method includes sending a first registration request to the network node, and sending an SMS indication, where the SMS indication shows either that the first registration request is only for SMS over the CS domain or that the registration request is a PS domain registration sent before a CS domain registration and is for SMS over the PS domain.

Also in accordance with aspects of this invention, there is provided a UE configured for registering the UE with a network node of a communication network for SMS messages over at least one of a CS domain and a PS domain. The UE includes an electronic processor circuit configured for sending a first registration request and an SMS indication to the network node, where the SMS indication shows either that the first registration request is only for SMS over the CS domain or that the registration request is a PS domain registration sent before a CS domain registration and is for SMS over the PS domain.

BRIEF DESCRIPTION OF THE DRAWINGS

The several features, objects, and advantages of this invention will be understood by reading this description in conjunction with the drawings, in which.

DETAILED DESCRIPTION

In this application, wireless communication devices are denoted as UEs, but that is not intended to limit the wireless communication devices to equipment handled directly by human users (e.g., mobile phones). The term UE is intended in this application to include all types of wireless communication devices, for instance wireless communication devices adapted for so-called machine-type communication or machine-to-machine communication.

In some embodiments of this invention, a UE can advantageously provide an indication that its registration in the CS domain is intended only for SMS that is included in or accompanies a registration request, e.g., a combined registration for both the CS and PS domains. In other embodiments of this invention, a UE can advantageously change the conventional order of its domain registrations, e.g., by performing a PS-domain registration before a CS-domain registration, when it will send SMS messages over the PS domain. In still other embodiments of this invention, a UE can advantageously indicate its intention to use or support for SMS over the PS domain and/or be informed about network support for SMS over the PS domain before the UE attempts a network registration, e.g., a Location Area Update (LAU), over the CS domain. In those ways, if the PS domain is available for SMS, CS registration can be avoided and the PS domain used for SMS. It will be understood that although aspects of this invention are described using an SGSN for sending SMS messages over a PS domain and a 2G and/or 3G RAT, it is also possible to employ aspects of this invention in an E-UTRAN (LTE RAT) using an MME rather than an SGSN for controlling PS-type communication and SMS over the PS domain.

Figure 1:
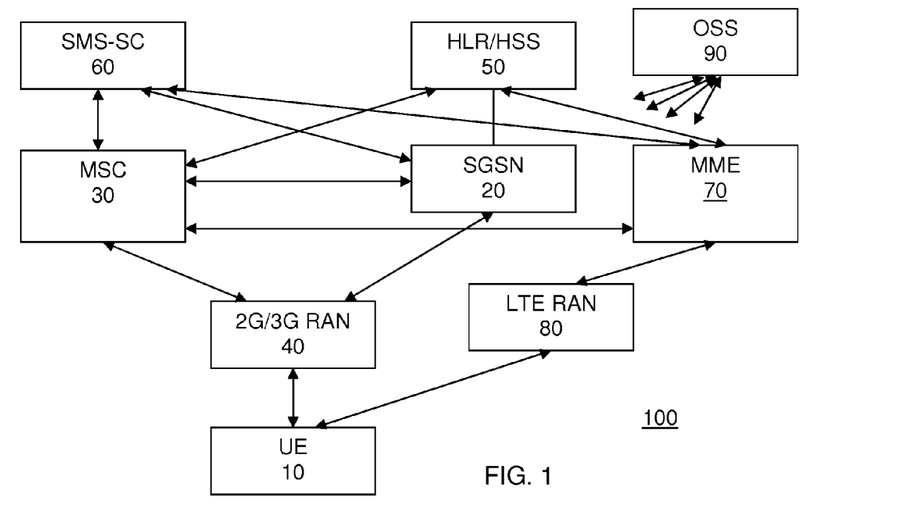
FIG. 1 is a block diagram of communication network.

FIG. 1 is a block diagram that schematically illustrates part of a cellular communication system 100, which is an environment in which embodiments of this invention can be employed. A UE 10 is configured for communicating wirelessly with an SGSN 20 through a 2G and/or 3G radio access network (RAN) 40 or with an MME 70 through an LTE RAN 80. The SGSN 20 can be a network node by itself or it can be included in a network node that also includes other modules or functionalities of the network 100. The SGSN 20, like the other entities depicted in FIG. 1, can be implemented as a suitably programmed or configured electronic processor or computer and memory. The SGSN handles PS-domain communication over the 2G/3G RAN 40, which for a 2G RAN typically includes a number of base transceiver stations and base station controllers (BSCs) with the BSCs in communication with the MSC and SGSN and for a 3G RAN typically includes a number of Node Bs and radio network controllers (RNCs) with the RNCs in communication with the MSC and SGSN. The MME 70 can also be a network node by itself or it can be included in a network node that also includes other modules or functionalities of the network 100. The MME controls PS-domain communication over the LTE RAN 80, which typically includes a number of evolved Node Bs (eNBs).

As illustrated in FIG. 1, the UE 10 can also wirelessly communicate with an MSC 30 via the 2G/3G RAN 40. The MSC 30 can also be a network node by itself or it can be included in a network node, e.g., the same node as the SGSN 20 and/or the MME 70. The MSC 30 handles CS-domain communication over the 2G/3G RAN 40, and can handle CS-domain communication over the LTE RAN via the SGs interface to the MME 70.

Also shown in FIG. 1 are an HLR/HSS 50 and an SMS Service Center (SMS-SC) 60. The communication system also typically includes an operation support system (OSS) 90 that is logically connected to the nodes in the RANs 40, 80 and to the core network (CN) nodes, e.g., the SGSN 20, MSC 30, and MME 70. The OSS 90 generally enables the network operator to control the network 100 and perform functions, such as configuration of network nodes and other operations/maintenance support functions.

In general, the CS domain of the network 100 includes the MSC 30, and the PS domain of the network 100 includes the SGSN 20. The HLR 50, SMS-SC 60, and OSS 90 provide services to the CS and PS domains.

The network entities or nodes depicted in FIG. 1 exchange specified messages for mobility management (MM) through specified interfaces, such as a Gs interface between the SGSN 20 and the MSC 30. Using the Gs interface, specified procedures in 2G/3G networks, such as Location Area Update (LAU) for the CS domain riding along with GPRS MM (GMM) Attach and Routing Area Update (RAU) for the PS domain via the SGSN, are performed. Similar procedures in the PS and CS domains can be combined to save radio resources when the Gs interface is used, as the SGSN forwards the CS LAU to the MSC and a UE sends only combined GMM/MM messages. PS Attach and CS Attach procedures carried out upon powering up a UE respectively enable that UE to be "known" to the PS and CS domains of the network

100. A UE 10 initiates a PS Attach procedure by sending an Attach Request message to the SGSN 20. For example, Clause 4 of 3GPP TS 24.008 V11.0.0, Mobile Radio Interface Layer 3 Specification, Core Network Protocols, Stage 3 (Release 11) (September 2011) discusses registration procedures.

Three network modes of operation (NMOs) are discussed in Clause 6.20 of the above-cited 3GPP TS 23.888, and in the above-cited 3GPP TS 24.008, which also refers to 3GPP TS 23.060. NMOs are sometimes called Iu modes or network operation modes (NOMs), and the particular NMO generally indicates whether the network has a Gs interface between the CS CN and PS CN, i.e., between the MSC 30 and the SGSN 20. For example in a UTRAN (3G network), NMO-I indicates that the Gs interface is present, and NMO-II indicates that the GS Interface is not present. In a GERAN (2G network), NMO-I indicates that a Gs interface is present, and NMO-II or NMO-III indicates that the Gs interface is not present. Conventionally for NMO-I, a UE always performs a Combined Attach (GMM Attach and IMSI Attach) procedure, with the GMM Attach Request message having the attach type set to Combined Attach. Conventionally for NMO-II/III, a UE always separately performs an IMSI Attach procedure (via an LAU) and a GMM Attach procedure, with the IMSI (CS-domain) Attach always performed before the GMM (PS-domain) Attach procedure.

Figure 2:
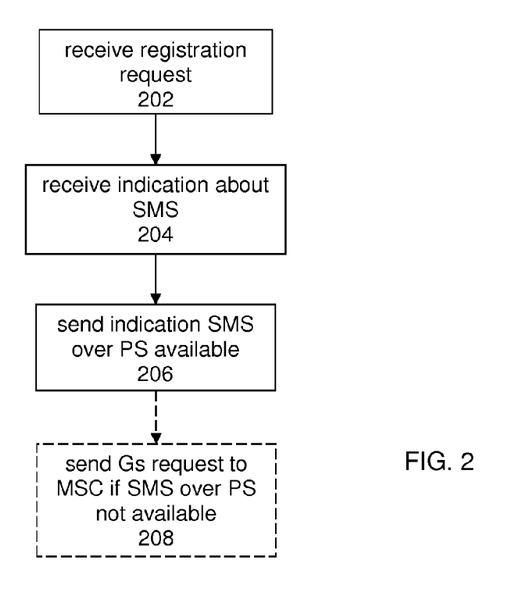
FIG. 2 is a flowchart of a method in accordance with this invention.

FIG. 2 is a flowchart of a method according to a first aspect of this invention. The method can be carried out in a network node, such as an SGSN 20, MME 70, OSS 90, etc., for a cellular communication system having an SGSN and/or MME for registering a wireless communication device to enable the wireless communication device to send SMS messages over the PS domain. In step 202, a registration request sent by the UE 10 is received by the SGSN 20 (or by the MME 70). The registration request received by the SGSN from the wireless communication device 10 can be, for example, part of conventional Attach and RAU procedures for the PS domain or of Combined Attach and Combined RAU procedures for the PS and CS domains, depending on the NMO of the network 100.

If the network is in NMO-I, the network node receives a UE's combined registration request that includes or is accompanied by an indication that the CS-domain registration is only for SMS. If the network is in NMO-II or NMO-III, the network node receives a UE's PS-domain registration request before the UE's CS-domain registration request, which is to say that the UE changes the conventional order of the requests, when the UE will use the PS domain for SMS. Thus, the UE's transmission or the node's receipt of a PS-domain registration request before a CS-domain registration is implicitly and is interpreted in this application as an indication about SMS for the UE. In any NMO, the network node can instead or in addition receive a registration request that includes or is accompanied by an indication that the UE intends to use the PS domain for SMS or supports such use.

Thus in step 204, an indication about SMS for the UE is received by the SGSN 20 (or by the MME 70). In some embodiments, the indication shows that the CS-domain registration by the UE 10 is only for SMS, which is to say that the UE 10 intends to use the CS domain only for SMS messages. In other embodiments, the indication shows that the UE intends to use or supports the PS domain for SMS messages, e.g., by a reverse-order PS-domain registration before a CS-domain registration when the opposite is conventionally specified.

An indication about SMS can be sent by the UE 10, for example, as part of a network registration request, e.g., as part of a Combined CS and PS Attach request message or a PS Attach message, either explicitly or implicitly as described above. A conventional combined Attach request message is described in Clause 4.7.3.2.1, Combined CPRS Attach Procedure Initiation, and shown in Table 9.4.1 of 3GPP TS 24.008.

In accordance with aspects of this invention, the messages specified by 3GPP TS 24.008 can be modified to include one or more information elements (IEs) that relate to SMS-only service. When the UE 10 initiates a combined GPRS/IMSI attach procedure for SMS-only service, the UE can indicate "SMS only" in a suitable IE in the Attach request message. For example, an IE corresponding to an additional update type, i.e., SMS-only, can be a replacement for or re-use of a suitable IE already included in the Attach message.

In some embodiments, the HLR/HSS 50 can include data in an entry associated with the UE 10 that can indicate that the UE 10 should preferably send SMS over the PS domain, and in other embodiments, the data in the entry can indicate that the UE 10 is allowed to send SMS only over the PS domain. In either case, the data can be, for example, subscription data associated with the UE 10. In such embodiments, the indication received by the SGSN 20 or MME 70 about SMS for the UE 10 can be received from the HLR/HSS 50.

The registration method depicted in FIG. 2 can continue with sending (step 206) by the SGSN 20 (or the MME 70) to the UE 10 an indication that SMS over PS capability is available, provided of course that SMS over the PS domain is enabled in the SGSN (or the MME 70). The availability indication can be sent in various ways, e.g., by re-using or re-purposing a suitable IE in a GPRS Attach accept message according to 3GPP TS 24.008. Attach accept messages are described in Table 9.4.2, for example, of 3GPP TS 24.008, and can be arranged to include an IE for indicating additional network feature support. Such an IE can include one or more bits of one or more octets that have a value indicating that GPRS-SMS is supported. Typically, it is only the SGSN that sends such an indication to the UE, but that restriction is not necessary as the indication can be broadcast by one or more nodes in a RAN. The artisan will also understand that an MME 70 in an LTE communication system according to 3GPP Release 8 and later can send such an indication to the UE over LTE.

Aspects of sending an indication that SMS over PS capability is available are described in more detail below.

If SMS over PS capability is not available, e.g., SMS over the PS domain is not enabled in the SGSN 20, the method can further include sending (step 208), by the SGSN 20, an otherwise conventional Gs request to the MSC 30 for registering the UE 10 with the MSC to send SMS over the CS domain. In the EPS of an LTE communication system, the UE typically always needs to be combined EPS/IMSI attached to enable SMS over the NAS. For LTE communication systems according to Release 8 and later of the 3GPP specifications, the UE can carry out a combined EPS mobility management (EMM)/IMSI Attach procedure with an SMS-only indication for the IMSI registration (i.e., for the CS-domain registration). In that way, a UE that was combined EPS/IMSI attached over LTE with the SMS-only indication was able to send SMS via the NAS, even if the MME supported SMS without the SGs interface (e.g., as an MME-MSC). For a Release 11 system, the MME (together with the HSS) can decide whether to use SMS over SGs (i.e., via the MSC and the CS domain) or "pure" PS-domain-based SMS from the MME toward the SMS infrastructure.

Figure 3:
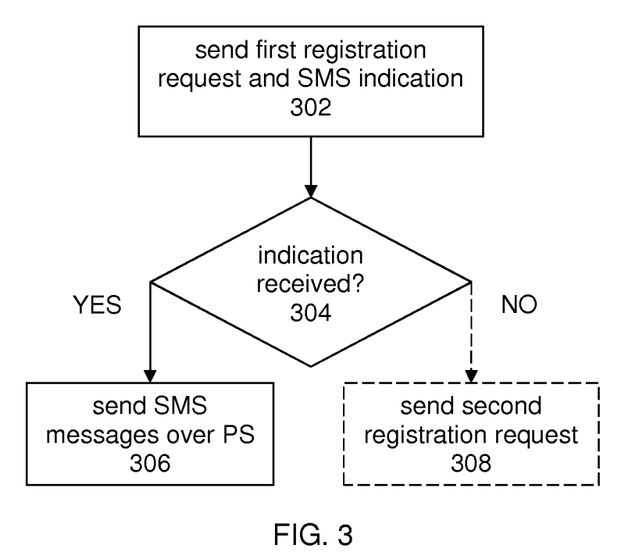
FIG. 3 is a flowchart of a method in accordance with this invention.

FIG. 3 is a flowchart of a method according to another aspect of this invention. The method can be carried out in a UE or other wireless communication device for registering the UE with a network node of a cellular communication system, the network node, for example including an SGSN, for sending SMS messages over at least one of a CS domain and a PS domain. It should be understood that the order of the steps depicted in FIG. 3 need not be exactly that depicted, but the order can change as described in more detail below.

In step 302, a registration request, e.g., a first registration request, is sent by the UE 10 to the SGSN 20. The first registration request calls for a registration of the UE 10 with the network node that enables the UE to send SMS. For example, the first registration request can be a combined CS-domain and PS-domain registration request or a part of an otherwise conventional PS Attach procedure or RAU procedure. As described above, the first registration request includes or is accompanied by an SMS indication by the UE that shows either that the registration request is only for SMS over the CS domain or that the registration request is for SMS over the PS domain. As in the methods depicted by FIG. 2, the UE 10 can send an explicit indication to the SGSN 20 about SMS for the UE, e.g., that the UE's CS-domain registration is only for SMS or that the UE intends to send SMS over the PS domain through the network node, or such an indication can be sent or caused to be sent by another network entity, such as the HLR/HSS 50. Alternatively, the indication can be implicit by sending separate registration requests in other than the conventional order, e.g., sending a PS-domain registration request before a CS-domain registration request, e.g., IMSI Attach and LAU procedures, and possibly include an indication that the UE intends to send SMS over the PS domain through the network node.

The method can continue with determining (step 304) by the UE 10 whether it has received from the SGSN 20 (or the MME 70) an indication that SMS over the PS domain is available. If so (Yes in step 304), the UE 10 can send (step 306) one or more SMS messages over the PS domain through the network node.

FIG. 3 also illustrates an optional step 308 of the method, in which if no indication that SMS over the PS domain is available has been received (No in step 304) from the SGSN 20 (or MME 70) by the UE 10, a subsequent registration request, e.g., a second registration request, is sent by the UE 10 to the MSC 30 so that the UE 10 can send SMS over the CS domain. The second registration request, which would be sent if the first registration request was a PS Attach request, can be, for example, part of an otherwise conventional CS-domain (IMSI) Attach procedure and/or an otherwise conventional LAU procedure.

For example, messages specified by 3GPP TS 24.008 can be arranged to use an LAU procedure for both cases by providing that IMSI attach is performed by using the location updating procedure, with a location updating type IE in the LOCATION UPDATING REQUEST message indicating IMSI attach. The UE 10 can determine that it has not received an SMS-over-PS-available indication in several ways, for example, by determining that no such indication has been received during a period of time, e.g., a predetermined period of time, or that the SGSN or MME has sent an explicit indication that SMS over the PS domain is not available, or that the Attach Accept or RAU Accept message did not include any indication that SMS over the PS domain is supported.

A suitable indication that SMS over PS capability is available can be provided (step 206 in FIG. 2) in a number of ways by the network 100. In a first alternative, an SMS-over-PS capability indication can be included in a PS-domain registration procedure, such as in GPRS Mobile Mobility (GMM) Attach Accept messaging and RAU Accept messaging, according to the specifications described above. In a second alternative, one or more RAN nodes of the network 100 can broadcast an "SMS-over-PS support" indication that can be preconfigured into a RAN node or nodes or it can be passed to a RAN node or nodes as a capability indication from a CN node (e.g., an SGSN, MME, or MSC).

Alternative 1

Figure 4:
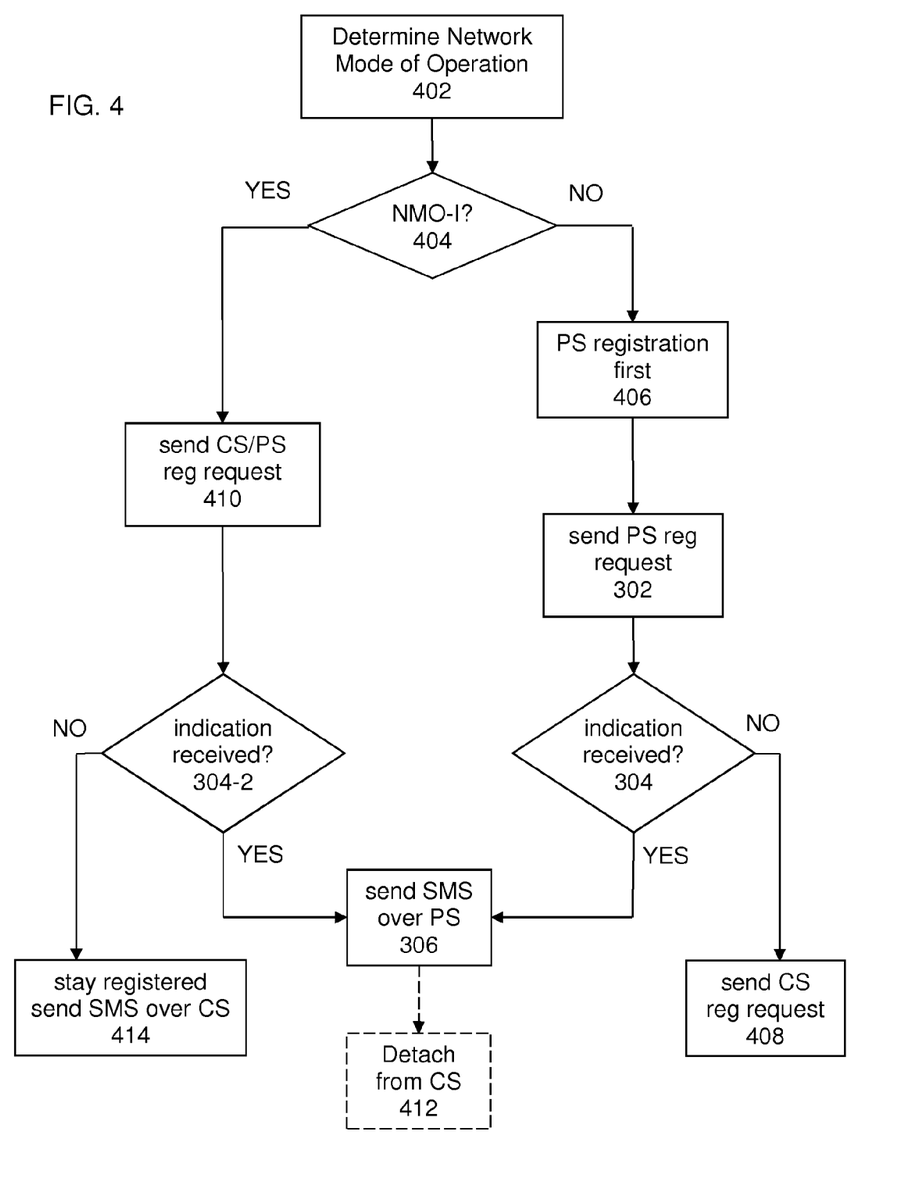
FIG. 4 is a flowchart of a method of operating a UE in a network.

FIG. 4 is a flowchart that depicts methods of operating a UE in a network having CS and PS domains, including a network that provides an SMS-over-PS capability indication in messaging of a registration procedure. This first alternative of providing the capability indication can be used in different ways by UEs that want to use SMS as described above, depending on the network's mode of operation.

Initially as depicted in FIG. 4, a UE 10 determines (step 402) the NMO of the network 100, for example based on the network broadcast system information that includes PS-domain specific system information as described in Clause 4.1.1.4 of 3GPP TS 24.008, for example. It should be understood, of course, that a UE can determine the NMO in several ways. For example, Clause 4.1.1.4 also permits an NMO indication that requires an additional UE configuration to be used. In a network 100, the RAN 40, 80 can be conventionally configured, e.g., by the OSS 90, to broadcast the NMO, and so the UE is able to determine the NMO in a suitable conventional way.

Network in Network Mode of Operation II or III (NMO-II/III)

A UE 10 typically performs MM or IMSI registration (CS domain) before GMM registration (PS domain), but if the UE wants only to use SMS over PS, the UE can reverse the order of those procedures. Thus, if the UE determines that the network 100 is operating in NMO-II or NMO-III (NO in step 404), the UE starts a PS-domain registration before a CS-domain registration (step 406) by sending a PS-domain registration request, such as a PS Attach Request and RAU Request (step 302). UE actions that are the same in FIG. 4 as in FIG. 3 have the same reference numbers.

In step 304 depicted in FIG. 4, the UE 10 determines whether it has received an indication that the network 100 has SMS-over-PS capability. As depicted by step 206 in FIG. 2, the network can include in the PS Attach Accept messaging and RAU Accept messaging an indication that SMS over the PS domain is supported. If the UE receives the indication (as depicted by Yes in step 304), the UE can send (step 306) SMS messages over the PS domain, and with respect to CS-domain (MM) registration, the UE can be left in a Deregistered state without performing an MM registration. If the SMS-over-PS-capability indication is not received by the UE (No in step 304), the UE can carry out (step 408) a CS domain registration, such as by sending (step 410) a CS Attach Request or an LAU Request or, when the network supports the Gs interface between the SGSN and MSC, a Combined Attach Request, so that the UE registers in the CS domain. In general, current 3GPP standards provide that the UE always performs separate PS-domain and CS-domain registrations for NMO-II and NMO-III.

To try to reduce signaling overhead, it can be advantageous for a UE to assume that PS-over-SMS capability is consistent within a PLMN, and so a UE's failure to receive a SMS-over-PS capability indication in a PS Attach Accept or RAU Accept message (No in step 304) can cause the UE to use (step 408) the typical order of registration procedures in that PLMN for subsequent registrations. Thus, the UE would attempt MM registration, e.g., an LAU, before attempting GMM registration.

As described in detail above, it is also advantageous for a UE to indicate in its LAU/RAU Request or other combined registration messaging (step 410) that the CS-domain registration is for only SMS service and/or that the UE intends to send SMS messages through the PS domain. Such SMS indications can be suitably included in or accompany a registration request. The network 100 can then reject the CS-domain registration request if the network "knows" that this particular UE can get SMS via the PS domain as described above. LAU reject messages are described in 3GPP TS 24.008, clauses 4.4.4.7 and 9.2.14, for example. In accordance with aspects of this invention, conventional reject messages to the UE are modified to the extent that they include a new MM cause code, such as "CS services not allowed in this PLMN". As described above, such modifications can be implemented either by including one or more new IEs in the reject message or by re-using or re-purposing one or more of the currently specified IEs. In this way, additional signaling overhead is avoided and the UE is still informed that it can try another (e.g., GMM, or PS domain) registration.

Network in NMO-I

In a network 100 operating in NMO-I, a UE 10 conventionally performs a combined MM (CS domain) registration and GMM (PS domain) registration, for example by starting an IMSI Attach/LAU procedure and a GMM Attach/RAU procedure. The combined registration can be modified to include an indication that the CS registration is only for SMS service. If the UE determines that the network 100 is operating in NMO-I (YES in step 404), the UE starts the combined registration by sending (step 410) a suitable combined registration request, such as a Combined GPRS/IMSI Attach Request or LAU/RAU Request, that includes or is accompanied by the SMS indication. As an alternative to bothering to determine whether the network 100 is operating in NMO-I (i.e., step 402) or when the network is operating in NMO-I, the UE can simply perform PS before CS registration (steps 406, 302, 304, 306, 408).

In step 304-2 depicted in FIG. 4, the UE 10 determines whether it has received an indication that the network 100 has SMS-over-PS capability. As depicted by step 206 in FIG. 2, the network can include in the PS Attach Accept messaging and RAU Accept messaging an indication that SMS over the PS domain is supported. If the UE receives the indication (Yes in step 304-2), the UE can send (step 306) SMS messages over the PS domain. As an option, the UE can initiate (step 412) a detach procedure for CS services because services over the CS domain are not needed, e.g., in case the network did not already reject such CS registration in the course of the combined registration procedure. As described below, an indication in the combined registration that the CS registration is only for SMS service can cause the network to reject the CS registration if it knows that the UE can get SMS over the PS domain, thereby avoiding the need for additional signaling.

If the network does not indicate in the PS Attach/RAU Accept messaging that SMS-over-PS is available (NO in step 304-2), the UE can remain registered (step 414) in the PS and CS domains in order to maintain SMS.

As in NMO-II/III, it can be advantageous for a UE to assume that PS-over-SMS capability is consistent within a PLMN, and so to reduce signaling overhead when the network has indicated SMS-over-PS support in a PS Attach/RAU Accept message, the UE can use the conventional RAU procedure upon a change of routing area by the UE instead of starting a Combined Attach/RAU.

As an alternative to starting a Combined Attach/RAU procedure (step 410), a UE 10 can start a conventional PS Attach/RAU procedure (step 302), and if the network indicates in the PS Attach/RAU Accept messaging that SMS-over-PS is not available, the UE can initiate an LAU procedure (or other CS-domain registration) for CS services. Otherwise, the UE can keep MM in the Deregistered state without performing a separate CS-domain registration.

As described above, it can be advantageous for a UE to assume that PS-over-SMS capability is consistent within a PLMN, and so to reduce signaling overhead when the network has not included in the Attach Accept messaging an indication that SMS-over-PS is available, then upon a change of routing area by the UE and instead of starting a conventional PS Attach/RAU, the UE can use the Combined Attach/RAU procedure described above.

As noted above, it can be advantageous for a UE to indicate in the Combined Attach/RAU messaging that the CS-domain registration attempt is for only SMS service. The network can then reject the CS registration if it knows that this particular UE can get SMS via the PS domain, and include a new MM cause code, such as "CS services SMS-only not allowed in this PLMN", in the reject messaging to the UE. In that way, additional signaling overhead and unneeded registration of the UE in the CS domain are avoided.

Alternative 2

As noted above, the second alternative involves one or more RAN nodes of the network 100 broadcasting an "SMS-over-PS support" indication that can be preconfigured into a RAN node or nodes or passed to a RAN node or nodes as a capability indication from a CN node, such as the OSS 90. A suitable SMS-over-PS-support indication can be included as an information element in the system information that is broadcast in each cell of a RAN 40, 80. For example, broadcast system information for a UTRAN (3G) is specified in chapter 8.1.1 of 3GPP TS 25.331 V8.16.0, Radio Resource Control (RRC), Protocol Specification (Release 8) (September 2011) and for a GERAN (2G) in chapter 3.2.2.1 of 3GPP TS 44.018 V8.13.0, Mobile Radio Interface Layer 3 Specification, Radio Resource Control (RRC) Protocol (Release 8) (September 2011). 3GPP TS 36.331 specifies the RRC protocol for an E-UTRAN.

In a network 100 operating in NMO-II or NMO-III, a UE 10 that wants to use SMS over PS is configured to determine whether it has received a broadcast SMS-over-PS indication. This is equivalent to step 304 depicted in FIG. 3, but carried out before sending the first registration request (step 302 in FIG. 3). If an SMS-over-PS indication has been received, the UE's first registration request can be for only GMM registration (step 302 in FIG. 3), thereby leaving the UE's MM in a Deregistered state (or at least in an out-of-service state, as the MM already could have registered over the SGs interface, which can be considered an upgraded Gs interface). If a broadcast SMS-over-PS indication has not been received, the UE can simply carry out a CS registration action, such as an LAU, and then a PS Attach/RAU or another suitable CS-domain registration or CS+PS registration.

In a network 100 operating in NMO-I, if an SMS-over-PS indication has been received (step 304 in FIG. 3), the UE's first registration request can be a "normal" GMM Attach/RAU (step 302 in FIG. 3) and can leave the UE's MM in the Deregistered state (or at least in the out-of-service state, as the MM already could have registered over the SGs interface). If a broadcast SMS-over-PS indication has not been received, the UE can simply carry out a Combined CS+PS Attach/RAU or another suitable registration procedure.

It can be advantageous to enable a network supporting SMS-over-PS to differentiate behavior based on policies depending on UE subscription (for example, to let M2M UEs use SMS over the PS domain and to let "normal" UEs use SMS over the CS domain). A network can be so enabled by including an indication that "CS preferred for SMS" in Attach/RAU Accept messaging that would trigger a LAU.

It should be understood that in some of the embodiments described above, a UE itself may not know that it shall operate in the PS-only mode. That "knowledge" can instead be configured as part of the UE's subscription data in the HLR/HSS by a "PS-only+SMS preferred" or "PS-only preferred" or "Only-PS-allowed" parameter. When the UE registers in the network using an Attach or RAU procedure, the respective subscription parameter (i.e., "PS-only+SMS preferred" or "PS-only preferred" or "Only-PS-allowed") is passed to the UE and stored in the UE. The subscription parameter can be passed as a new IE or as a modification of an already specified IE, e.g., by extending the range of values of the IE to accommodate the subscription parameter. For example, when a UE 10 performs a combined registration to the PS and CS domains and the network rejects the CS registration as describe above, an IE in the reject message, such as GMM cause as described in Table 9.4.4 of 3GPP TS 24.008, can be modified to carry the subscription parameter to the UE. It will be understood that any of modifying the range of values of an existing IE, changing the purpose of an existing IE, providing a new IE, and providing a new message can be used for implementing any of the indications and information described in this application.

In some embodiments, the first time (and every time) the UE makes a PS Attach/RAU attempt, it locally stores the "PS-only+SMS preferred" or "PS-only preferred" or "Only-PS-allowed" parameter in a suitable memory in the UE. The parameter can advantageously be persistent, surviving power cycling of the UE.

As an enhancement or option, the "PS-only+SMS preferred" or "PS-only preferred" or "Only-PS-allowed" parameter can also be configured by the network operator, e.g., on the UE's user services identity module (USIM) and/or through UE device management (DM) according to the Open Mobile Alliance (OMA). The UE can then read the parameter to know which mode the UE is required to work in.

For example, a UE can use a "PS-only+SMS preferred" parameter to decide which mode it operates in when it performs the Alternative 1 or Alternative 2 methods described above. If the UE has already registered to the CS domain when the parameter is received the first time, the UE can deregister from the CS domain (or at least leave its MM in an out-of-service state) if SMS is supported over the PS domain.

For a "PS-only preferred" or "Only-PS-allowed" parameter, the UE can register (e.g., by performing Attach/RAU) in only the PS domain, regardless of whether the network sends an SMS-over-PS capability indication as part of the Attach/RAU procedure or in broadcast information. If the UE has already registered to the CS domain when the parameter is received the first time (or has changed), the UE can deregister from the CS domain (or at least leave its MM in an out-of-service state).

It will be appreciated that some embodiments of this invention have an advantage that a relatively small amount of signaling is required to steer a UE toward the PS domain for SMS. Furthermore, some embodiments of this invention have an advantage that they do not require a subscription update, i.e., they can be used for load control for any subscription.

Figure 5:
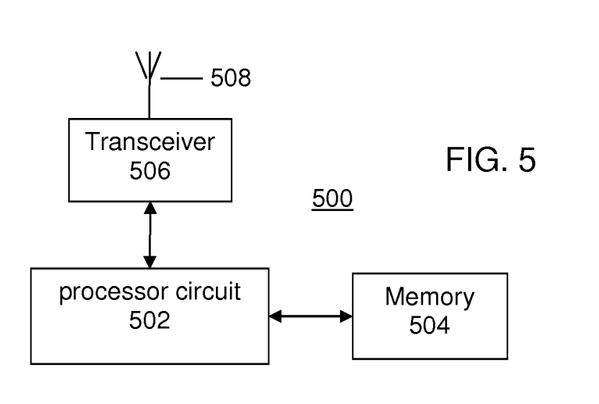
FIG. 5 is a block diagram of a wireless communication device that can be configured in accordance with this invention.

FIG. 5 is a block diagram of an example of a UE 500, showing an electronic processor circuit 502, an electronic memory circuit 504, a radio transceiver 506, and a radio antenna 508. Some or all of the functionalities described above as being provided by mobile communication devices or other forms of UE can be implemented by the processor's execution of program instructions stored on a computer-readable medium, such as the memory shown in FIG. 5. Alternative embodiments of the UE can include additional components beyond those shown in FIG. 5 that can be responsible for providing aspects of the UE's functionality, including any of the functionality described in this application and/or any functionality necessary to support the methods described in this application.

In particular, the UE 500 can be configured for registering with a network node, such as the SGSN 20 or MME 70 of the network 100 for sending SMS messages over the network's PS domain via the network node. The electronic processor circuit 502 can then be configured, for example by suitable programming stored in the memory 504, for sending a first registration request to the network node, the first registration request calling for registration of the UE with the network node to enable sending SMS messages over the PS domain. The electronic processor circuit 502 can be further configured for determining whether an indication that SMS over the PS domain is available has been received, and for sending, if the indication has been received, an SMS message over the PS domain through the network node.

As described above, the first registration request can be a part of an Attach procedure or an RAU procedure, and the electronic processor circuit 502 can be further configured for sending an indication to the network node that the UE intends to send SMS over the PS domain through the network node and/or for sending an indication to the network node that its CS registration is only for SMS. Furthermore, the electronic processor circuit 502 can be configured for carrying out GMM (PS domain) procedures before MM (CS domain) procedures as described above. Moreover, the electronic processor circuit 502 can be configured for sending, if the indication has not been received, a second registration request for registering the UE with the MSC 30, and the second registration request can be a part of an Attach procedure or a location area update procedure.

Determining whether the indication has been received can include determining whether the indication has been received during a predetermined period of time or whether an indication that SMS over the PS domain is not available has been received. Determining whether the indication has been received can include determining whether the indication is included in a GPRS Mobile Mobility Attach Accept message or a Routing Area Update Accept message. Determining whether the indication has been received can include determining whether the indication is included in information broadcast by the network.

Figure 6:
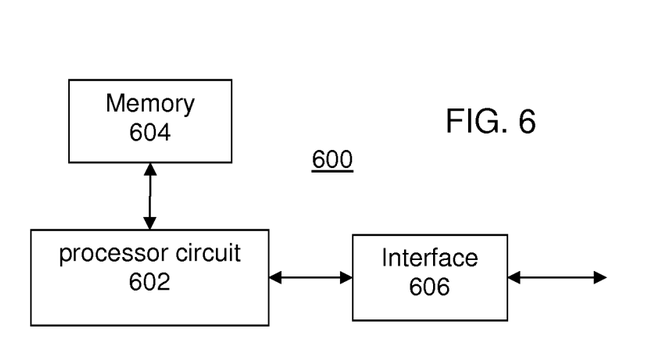
FIG. 6 is a block diagram of a network node that can be configured in accordance with this invention.

FIG. 6 is a block diagram of an example of a network node 600, such as an SGSN 20 or a node that includes the SGSN 20, in a communication network. The example node includes an electronic processor circuit 602, an electronic memory 604, and an interface 606 for sending and receiving messages, indications, and other information. Some or all of the functionalities described above as being provided by an SGSN, or any of the other entities in a network, can be implemented by the processor 602's execution of program instructions stored on a computer-readable medium, such as the memory 604 shown in FIG. 6. Alternative embodiments of the node 600 and of other network entities can include additional components beyond those shown in FIG. 6 that can be responsible for providing aspects of additional functionality, including any of the functionality described in this application and/or any functionality necessary to support the methods described in this application.

In particular, the network node 600 can implement the functionalities of one or more of the SGSN 20 and MME 70, and so be configured for registering the UE 10 in the network 100 to enable the UE to send SMS messages through the PS domain. The electronic processor circuit 602 of the node 600 can then be configured by suitable programming for receiving a registration request sent by the UE and an indication that the UE intends to send SMS messages through the PS domain and/or an indication that the UE's CS registration is only for SMS. If the network node is capable of handling SMS messages through the PS domain, the electronic processor circuit is further configured for sending an indication that SMS over PS capability is available to the UE.

As described above, a UE's registration request can be a part of an Attach and RAU procedure or a Combined Attach procedure for GPRS and non-GPRS services, and it can include an indication that the UE intends to send SMS messages through the PS domain. Such an indication that the UE intends to send SMS messages through the PS domain can be part of the UE's respective entry in the HLR/HSS 50. If the node 600 is not capable of handling SMS messages through the PS domain, the electronic processor circuit 602 can be configured for sending a request to the MSC 30 for registering the UE with the MSC.

Moreover, the electronic processor circuit 602 can be configured, for example by suitable programming stored in the memory 604, for causing the indications described above, such as that SMS over PS capability is available, to be included in network information to be broadcast by the network 100. The electronic processor 602 can also be configured for causing the indications described above, such as the indication that SMS over PS capability is available, to be included in messages, such as Attach Accept and a LAU/RAU Accept messages, sent to and received from the UE 10. It will be understood that the activities of the electronic processor circuit 602 can in turn be caused by commands, messages, and similar signals from other network nodes, such as the OSS 90 that can send commands that ensure that the RAN starts broadcasting the relevant system information bits.

It will be appreciated that the methods and devices described above can be combined and re-arranged in a variety of equivalent ways, and that the methods can be performed by one or more suitably programmed or configured digital signal processors and other known electronic circuits (e.g., discrete logic gates interconnected to perform a specialized function, or application-specific integrated circuits). Many aspects of this invention are described in terms of sequences of actions that can be performed by, for example, elements of a programmable computer system. UEs embodying this invention include, for example, mobile telephones, pagers, headsets, laptop computers and other mobile terminals, and the like.

It will be appreciated that procedures described above are carried out repetitively as necessary, for example, to respond to the time-varying nature of communication channels between transmitters and receivers. In addition, it will be understood that the methods and apparatus described here can be implemented in various network nodes.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless devices implementing embodiments of this invention can be included in, for example, mobile telephones, pagers, headsets, laptop computers and other mobile terminals, base stations, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a storage medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many different forms, not all of which are described above, and all such forms are intended to be within the scope of the invention. For each of the various aspects of the invention, any such form may be referred to as "logic configured to" perform a described action, or alternatively as "logic that" performs a described action.

What is claimed is:

1. A method in a user equipment (UE) for registering the UE with a network node of a communication network for short message service (SMS) messages over at least one of a circuit-switched (CS) domain and a packet-switched (PS) domain, the method comprising:
   determining whether the network node has an interface between the CS domain and the PS domain;
   sending, to the network node, a first registration request that is for the CS domain and the PS domain if the network node has the interface, or is for the PS domain only if the network node does not have the interface, and an SMS indication; and
   sending a second registration request for registering the UE with the CS domain, to the network node, if the first registration request has been for the PS domain only, and a notification that the network node does not provides an SMS over PS domain capability has been received.

2. The method of claim 1, wherein the first registration request either is a part of Combined Attach and Location Area Update (LAU) and Routing Area Update (RAU) procedures for the CS domain and the PS domain, or is a part of Attach and RAU procedures for the PS domain initiated before International Mobile Subscriber Identity Attach and LAU procedures for the CS domain.

3. The method of claim 1, wherein if the first registration request has been for the CS domain and the PS domain, and the network node has an SMS over PS domain capability, the UE is detached from the CS domain.

4. The method of claim 1, wherein an indication that the UE intends to send SMS messages through the PS domain is part of an entry for the UE in a home location register in the network.

5. The method of claim 1, further comprising, when the first registration request is a part of Combined Attach and LAU and RAU procedures for the CS domain and the PS domain, and an SMS-related indication is received signaling that the network node is not handling SMS messages through the PS domain for the UE, sending a third registration request for registering the UE with a mobile switching center (MSC) in the network.

6. The method of claim 1, further comprising:
receiving an indication that SMS over PS capability is available from the network node.

7. The method of claim 6, wherein the indication that SMS over PS capability is available is received in network information broadcast by the network.

8. The method of claim 6, wherein the indication that SMS over PS capability is available is received in at least one of an Attach Accept message and a Routing Area Update Accept message.

9. A user equipment (UE) configured to request registering the UE with a network node of a communication network for short message service (SMS) messages over at least one of a circuit-switched (CS) domain and a packet-switched (PS) domain, the UE comprising:
an electronic processor circuit configured
to determine whether the network node has an interface between the CS domain and the PS domain;
to send, to the network node, a first registration request that is for the CS domain and the PS domain if the network node has the interface, or is for the PS domain only if the network node does not have the interface, and an SMS indication, and
to send a second registration request for registering the UE with the CS domain to the network node, if the first registration request has been for the PS domain only, and a notification that the network node does not have an SMS over PS domain capability has been received.

10. The UE of claim 9, wherein the first registration request either is a part of Combined Attach and Location Area Update (LAU) and Routing Area Update (RAU) procedures for the CS domain and the PS domain, or is a part of Attach and RAU procedures for the PS domain initiated before International Mobile Subscriber Identity Attach and LAU procedures for the CS domain.

11. The UE of claim 9, wherein if the first registration request has been for the CS domain and the PS domain, and the network node has an SMS over PS domain capability, the UE is detached from the CS domain.

12. The UE of claim 11, wherein the indication that the UE intends to send SMS messages through the PS domain is part of an entry for the UE in a home location register in the network.

13. The UE of claim 9, wherein the electronic processor circuit is further configured to send a third registration request for registering the UE with a mobile switching center (MSC) in the network, when the first registration request is a part of Combined Attach and LAU and RAU procedures for the CS domain and an SMS-related indication signaling that the network node is not handling SMS messages through the PS domain for the UE has been received.

14. The UE of claim 9, wherein the electronic processor circuit is further configured to receive an indication that the network node provides SMS over PS capability to the UE.

15. The UE of claim 14, wherein the indication is received in network information broadcast by the network.

16. The UE of claim 14, wherein the indication is received in at least one of an Attach Accept message and a Routing Area Update Accept message.

* * * * *